United States Patent [19]
Geislinger

[11] Patent Number: 6,095,924
[45] Date of Patent: Aug. 1, 2000

[54] ELASTIC TORQUE-TRANSMITTING COUPLING

[75] Inventor: Matthias Geislinger, Salzburg, Austria

[73] Assignee: Dr. Ing. Geislinger & Co. Schwingungstecnik Gesellschaft m.b.H., Hallwang/Salzburg, Austria

[21] Appl. No.: 09/012,617

[22] Filed: Jan. 23, 1998

[30] Foreign Application Priority Data

Feb. 4, 1997 [AT] Austria ..................................... 169/97

[51] Int. Cl.[7] ...................................................... F16D 3/72
[52] U.S. Cl. ............................... 464/80; 464/88; 464/181
[58] Field of Search .................................. 464/79, 80, 88, 464/100, 101, 181, 183, 92

[56] References Cited

U.S. PATENT DOCUMENTS

| | | | |
|---|---|---|---|
| 1,045,791 | 11/1912 | Hodge | 464/79 |
| 1,664,052 | 3/1928 | Ungar | 464/80 |
| 1,862,806 | 6/1932 | Ringwald | 464/80 |
| 2,693,222 | 11/1954 | Krupp | 464/88 |
| 3,091,979 | 6/1963 | Schaefer, Jr. et al. | 464/79 |
| 4,309,970 | 1/1982 | Sorsche et al. | 464/79 |
| 4,579,545 | 4/1986 | Chapman | 464/79 |
| 5,725,434 | 3/1998 | Haben et al. | 464/181 |
| 5,890,965 | 4/1999 | Deeg et al. | 464/88 |

FOREIGN PATENT DOCUMENTS

| | | | |
|---|---|---|---|
| 391 355 | 3/1990 | Austria . | |
| 395 639 | 6/1992 | Austria . | |
| 395 900 | 8/1992 | Austria . | |
| 395 901 | 8/1992 | Austria . | |
| 401 963 | 5/1996 | Austria . | |
| 364764 | 8/1906 | France | 464/79 |
| 1525341 | 7/1969 | Germany | 464/80 |
| 195793 | 5/1967 | U.S.S.R. | 464/80 |
| 1218192 | 3/1986 | U.S.S.R. | 464/79 |
| 179769 | 5/1922 | United Kingdom | 464/79 |
| 208008 | 12/1923 | United Kingdom | 464/79 |
| 763089 | 12/1956 | United Kingdom | 464/79 |

*Primary Examiner*—Eileen Dunn Lillis
*Attorney, Agent, or Firm*—Collard & Roe, P.C.

[57] ABSTRACT

A torque-transmitting coupling between a driven flange and a driving flange, which comprises a tubular portion having one end facing the driven flange, another end facing the driving flange and an axis extending between the driven and driving flanges, the tubular portion being divided into two tube sections extending from an axially normal parting plane towards the tubular portion ends, and each tube section having an outwardly protruding flange edge, the flanged edges facing each other in the parting plane and being screwed together, and two membrane portions having an outer periphery and an inner periphery, the outer periphery of one of the membrane portions being attached to the one tubular portion end, the outer periphery of the other membrane portion being attached to the other tubular portion end, and the inner peripheries of the membrane portions forming connecting edges being screwed to the driven and driving flanges, respectively. The tubular and the membrane portions consist of tiber-reinforced plastic material.

4 Claims, 1 Drawing Sheet

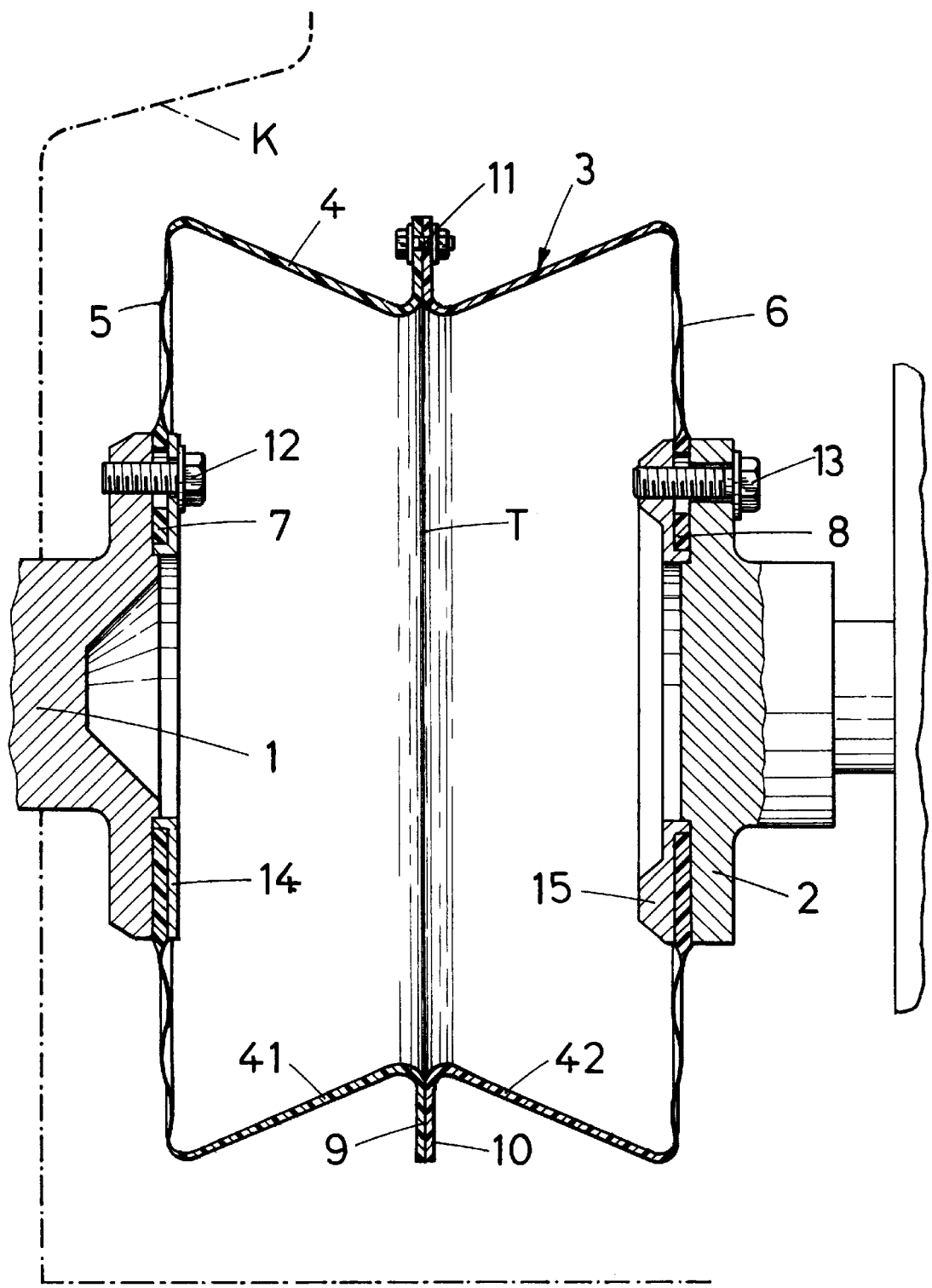

ELASTIC TORQUE-TRANSMITTING COUPLING

BACKGROUND OF THE INVENTION

1. Field of the Invention

This invention relates to a coupling member for the torque-transmitting drive connection between a driven flange on the side of the motor and a driving flange on the side of the transmission, comprising a central tubular portion and a membrane portion on the end face, where the membrane portions have connecting edges for being screwed to the driven and driving flanges, and where membrane portions and tubular portions consist of fiber-reinforced plastic material.

2. Description of the Prior Art

Coupling members consisting of tubular and membrane portions are mostly inserted as connecting element between the two halves of a shaft coupling or are directly inserted as shaft portion in a power train and ensure a perfect torque transmission not only because of their torsional strength, but due to the deformability of their membrane portions also provide for the compensation of the misalignment of the drive members to be coupled with each other, where different forms of membrane and tubular portion may be used depending on the requirements, and the tubuluar portions and membrane portions may be prefabricated as individual articles or be manufactured as uniform coupling elements (AT 391,355 B, AT 395,900 B, AT 395,901 B, AT 395,639 B and AT 401,963 B). However, these coupling elements require a corresponding amount of space above all in the case of high elasticity requirements, so that their use with cramped space conditions, for instance in drive systems of ships for the flexurally elastic drive connection between motor and transmission, is often difficult and for assembly purposes even requires the removal of the transmission, which definitely calls this use in question.

SUMMARY OF THE INVENTION

It is therefore the object underlying the invention to create a coupling member as described above, which by drawing full benefit from its material- and design-specific properties is characterized by its ease of assembly and disassembly.

This object is solved by the invention in that the membrane portions are attached at the tubular portion in the vicinity of the outer periphery and form the connecting edges in the vicinity of the inner periphery, that the tubular portion is divided into two tube sections along an axially normal parting plane, and the two tube sections are screwed together via outwardly protruding flange edges, and that preferably the membrane portion on the side of the transmission can be screwed to the associated driving flange from the outside by means of cap screws, and the membrane portion on the side of the motor can be screwed to the associated driven flange from the inside by means of cap screws. Since the tube portion is attached at the outer periphery of the membrane portions, it is despite their radially internally disposed connecting edge that the membrane portions can be dimensioned large enough to satisfy the desired requirements concerning the flexural elasticity, where an undulated profile of the membrane portions and a wall thickness decreasing to the outside are recommended. In addition, the correspondingly large diameter of the tubular portion effects a sufficient cavity inside the coupling member, which provides for the setting of fastening screws from the inside. When the tubular portion is in addition divided into two axial tubular sections and the parts can be screwed together from the outside, the coupling member can be assembled and disassembled section by section, when at least the one tube section is fixed at the associated flange via the associated membrane portion and by means of cap screws accessible on the outside. Since on the side of the transmission there is mostly a larger clearance than on the side of the motor, where due to the motor accessories to be accommodated, such as charging devices, filtering means and the like, there is a corresponding lack of space and due to the existing flywheel in the direct axial vicinity of the driven flange there hardly remains a space for setting fastening screws, the fixture of the coupling member on the side of the transmission will preferably be accessible from the outside. Having unscrewed the cap screws in the vicinity of the driving flange and the connecting screws between the two tube sections, it is now possible to release the tube section with associated membrane portion on the side of the transmission from the tube section on the side of the motor and remove the same separately, which because of the correspondingly smaller dimensions of this part of the coupling member as compared to the entire coupling member is easily possible, whereupon the cavity of the other tube section is accessible and the cap screws can be unscrewed for fixing the flange of the membrane portion on the side of the motor, so that the second tube section with adjoining membrane portion can also be removed without difficulty. The assembly or insertion of the coupling member is effected the other way round, in that first the one tube section, mostly the one of the side of the motor, together with its membrane portion is screwed to the driven flange from the inside, then the tube section with its membrane portion on the side of the transmission is added and the tube sections are screwed together from the outside and the membrane portion is screwed to the driving flange from the outside. The membrane portions themselves are not affected by this disassembly and their flexural elasticity and torsional capacity are not impaired, and due to the division and the mutual connection of the tubular portions via the flange edges the tubular portion experiences a stiffening promoting the torque transmission. The axial position of the parting plane can be optimized depending on the respective mounting conditions, where in most cases a central separation will be quite effective and provides for an identical design of both halves of the coupling member.

In fact it would very well be possible to prefabricate each of the membrane portion and the adjoining tube section as individual article and subsequently connect the same by bonding or screwing to form a constructional unit. It is, however, expedient when the tube sections with the membrane portions each form a uniform component which can be manufactured economically and is easy to handle.

It is also favorable when the tubular portions are conically tapered towards the flange edges, so that on the one hand the outwardly protruding flange edges need not protrude radially beyond the outer periphery of the membrane portions, and on the other hand a stiffening effect is achieved by the conicity of the tube sections, so that comparatively thin, uniform wall thicknesses are sufficient for the tubular portion.

BRIEF DESCRIPTION OF THE DRAWING

In the drawing, the embodiment of the inventive coupling member is schematically illustrated in detail by means of an axial section.

DESCRIPTION OF THE PREFERRED EMBODIMENT

For the drive connection between a driven flange 1 on the side of the motor and a driving flange 2 on the side of the transmission there is provided a torsionally resistant, but flexurally elastic coupling member 3 with a central tubular portion 4 and membrane portions 5, 6 on the end face, where the tubular portion 4 and the membrane portions 5, 6 consist of a fiber-reinforced plastic material.

To achieve that the coupling member 3 can easily be mounted even with cramped space conditions, the membrane portions 5, 6 each form a connecting edge 7, 8 for being screwed to the driving and driven flanges 1, 2 in the vicinity of the inner periphery, and in the vicinity of the outer periphery verge into the tubular portion 4, which in turn is divided into two tube sections 41, 42 along an axially normal parting plane T. These two tube sections 41, 42 are conically tapered towards the parting plane T and are screwed together via outwardly protruding flange edges 9, 10 by means of fastening screws 11 distributed around the periphery. For connection to the membrane portions 5, 6 the associated driving and driven flanges 1, 2 are provided with cap screws 12, 13, of which the cap screws 13 on the side of the transmission have been set from the outside, and the cap screws 12 on the side of the motor have been set from the inside and clamp the connecting edges 7, 8 of the respective membrane portions 5, 6 between the driven flange 1 and a thrust collar 14 engaging over the connecting edge 7 on the inside, or between the driving flange 2 and a movable flange 15 engaging over the connecting edge 8 on the inside.

In the case of cramped mounting conditions due to protruding accessories for the motor or the like, which are indicated by a contour K, the coupling member 3 can be dismantled for assembly and disassembly and be inserted or removed section by section. For disassembly, the fastening screws 11 and the cap screws 13 may first be unscrewed to separately release the tube section 42 from the driving flange 2 and the tube section 41 on the side of the motor and then be removed, whereupon the cap screws 12 can be unscrewed from the inside and the tube section 41 on the side of the motor can be removed, which is also possible with correspondingly narrow clearances. For assembly purposes it is then merely necessary the other way round to first of all fix the tube section 41 with the membrane portion 5 on the side of the motor from the inside at the driven flange 1 by means of the cap screws 12, so that subsequently the tube section 42 on the side of the transmission is inserted and can be screwed on the one hand to the already fixed tube section 41, and on the other hand can be screwed to the driven flange 2 from the outside, and the coupling member 3 is properly mounted.

What is claimed is:

1. A torque-transmitting coupling between a driven flange on the side of a motor and a driving flange on the side of a transmission, which comprises (a) a tubular portion having one end facing the driven flange, another end facing the driving flange and an axis extending between the driven and driving flanges, the tubular portion consisting of fiber-reinforced plastic material and being divided into
      (1) two tube sections extending from an axially normal parting plane towards the tubular portion ends, and each tube section having
      (2) an outwardly protruding flange edge, the flanged edges facing each other in the parting plane and being screwed together,
   (b) two membrane portions consisting of fiber-reinforced plastic material and having an outer periphery and an inner periphery,
      (1) the outer periphery of one of the membrane portions being attached to the one tubular portion end,
      (2) the outer periphery of the other membrane portion being attached to the other tubular portion end, and
      (3) the inner peripheries of the membrane portions forming connecting edges being screwed to the driven and driving flanges, respectively.

2. The torque-transmitting coupling of claim 1, comprising cap screws screwing one of the membrane portions to the driving flange from the outside of the coupling, and screwing the other membrane portion to the driven flange from the inside of the coupling.

3. The torque-transmitting coupling of claim 1, wherein the tube sections and the attached membrane portions form an integral unit.

4. The torque-transmitting coupling of claim 1, wherein the tube sections taper conically from the tubular portion ends towards the flange edges.

* * * * *

UNITED STATES PATENT AND TRADEMARK OFFICE
CERTIFICATE OF CORRECTION

PATENT NO.   : 6,095,924
DATED        : August 1, 2000
INVENTOR(S)  : Matthias GEISLINGER It is certified that error appears in the above-identified patent and that said Letters Patent is hereby corrected as shown below:

On the title page, column 1, Item [73], change the spelling of the assignee to read --Dr. Ing. Geislinger & Co. Schwingungstechnik Gesellschaft m.b.H.--.

Signed and Sealed this

Seventeenth Day of April, 2001

*Attest:*

NICHOLAS P. GODICI

*Attesting Officer*   *Acting Director of the United States Patent and Trademark Office*